United States Patent [19]
Slocum

[11] Patent Number: 5,090,265
[45] Date of Patent: Feb. 25, 1992

[54] SYSTEM TO CONVERT ROTARY MOTION TO LINEAR MOTION

[76] Inventor: Alexander H. Slocum, 1290 Bald Hill Rd., Mclean, Va. 22101

[21] Appl. No.: 271,012

[22] Filed: Nov. 14, 1988

Related U.S. Application Data

[63] Continuation-in-part of Ser. No. 77,804, Jul. 27, 1987, Pat. No. 4,836,042.

[51] Int. Cl.⁵ .............................................. F16H 25/24
[52] U.S. Cl. .................................. 74/424.8 R; 74/459; 74/468; 384/123
[58] Field of Search ............... 74/89.15, 424.8 R, 459, 74/468; 384/123

[56] References Cited

U.S. PATENT DOCUMENTS

| | | | |
|---|---|---|---|
| 2,320,353 | 6/1943 | Ernst et al. | 74/424.8 R |
| 3,171,295 | 3/1965 | Benckert | 74/424.8 R |
| 3,183,732 | 5/1965 | Porath | 74/424.8 R |
| 3,448,632 | 6/1969 | Rumbarger | 74/424.8 R |
| 3,670,583 | 6/1972 | Leming | 74/89.15 |
| 4,566,345 | 1/1986 | Erikson | 74/89.15 |
| 4,776,229 | 10/1988 | Zona | 74/468 |

FOREIGN PATENT DOCUMENTS

| | | | |
|---|---|---|---|
| 297164 | 1/1989 | European Pat. Off. | |
| 1550774 | 10/1969 | Fed. Rep. of Germany | 74/424.8 R |
| 2030260 | 3/1971 | Fed. Rep. of Germany | |
| 3731281 | 4/1988 | Fed. Rep. of Germany | |
| 1403703 | 5/1965 | France | |
| 58-166161 | 10/1983 | Japan | 74/424.8 R |
| 58-166162 | 10/1983 | Japan | 74/424.8 R |
| 59-151659 | 8/1984 | Japan | |
| 61-127966 | 6/1986 | Japan | |
| 394728 | 12/1965 | Switzerland | |
| 261849 | 6/1970 | U.S.S.R. | 74/424.8 R |
| 914165 | 12/1962 | United Kingdom | 74/468 |
| 1239557 | 7/1971 | United Kingdom | 74/89.15 |

*Primary Examiner*—Allan D. Herrmann

[57] ABSTRACT

In a system that includes a linearly movable carriage or the like, a mechanism to convert rotary motion of a leadscrew to linear motion of a nut and, hence, linear movement of the carriage to which the nut is mechanically secured. The leadscrew has a special threadform and the nut has a special threadform that matches the threadform of the leadscrew with a pressurized fluid interface therebetween, there being both axial clearance and radial clearance sufficient to accommodate angular and lateral misalignment between the leadscrew and the carriage. Shallow independent grooves along each side of the nut's helical threadform act to equalize fluid pressure across each respective side of the threadform and orifices or other fluid flow control devices connect to the grooves or passages to permit introduction of high pressure air or other fluid thereto. Exhausts are provided from the region by radial clearance between the leadscrew threadform and the nut threadform. Both threadforms are ideally in the form of square threads, i.e., threads whose axial thickness of the root of each tooth substantially equals the axial thickness of the peak thereof, i.e., rectangular threads. Also, for best results, the nut should have a single threadform of depth equal to about one-quarter the major diameter of the leadscrew, where the final shape of the nut thread is finish cast with epoxy to the shape of the screw using putty and mold release wax to attain necessary oil flow grooves and radial and axial clearance.

27 Claims, 4 Drawing Sheets

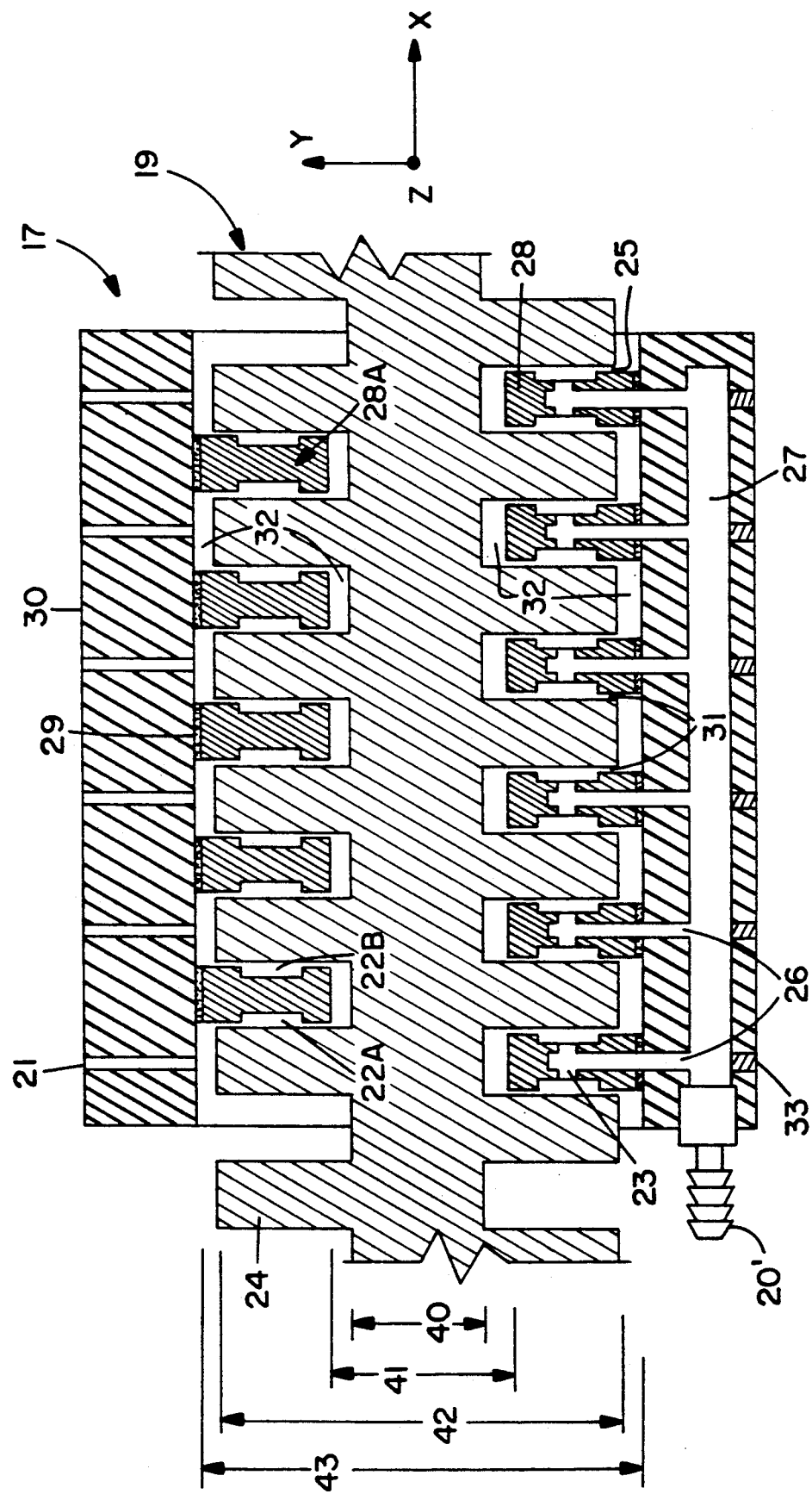

SYSTEM TO CONVERT ROTARY MOTION TO LINEAR MOTION

BACKGROUND OF THE INVENTION

This is a continuation-in-part of Ser. No. 077,804 filed July 27, 1987, now U.S. Pat. No. 4,836,042 which is incorporated by reference herein.

FIELD OF THE INVENTION

The present invention relates to mechanisms to convert rotary motion to linear motion.

SETTING OF THE INVENTION

There is disclosed herein a system that includes a nut to convert rotary motion from a leadscrew to linear motion by way of a special threadform which utilizes high pressure air, oil, or some other fluid as an interface between the threads of the nut and the threads of the leadscrew whereby, among other things, mechanical contact between the threads of the nut and leadscrew is prevented by the existence of a high pressure fluid layer between the two which acts to damp out mechanical noise. The special threadforms of the leadscrew and the nut, when supplied with high pressure fluid, provide a mechanism for the nut to very efficiently convert rotary power input to the leadscrew to linear power. The use of a fluid as an interface between the threadforms eliminates friction and results in almost 100% power conversion efficiency. The high pressure fluid interface between the threadforms also acts to preload the nut threadform between the leadscrew threadform thereby eliminating backlash between the leadscrew and nut. The special thread design (i.e. the rectangular thread disclosed herein), furthermore, enables the nut to act as a coupling between itself (i.e. self-coupling herein) and a movable carriage such that only forces along an axis parallel to the axis of the leadscrew are transmitted from the nut to the carriage. A leadscrew should ideally be stiff only in the axial direction; the bearing carriage that the leadscrew moves should act to maintain the radial and angular position of the leadscrew nut. Hence, potential misalignment forces and moments, along and about the other two axes that are orthogonal to the leadscrew axis will not be generated or transmitted as a result of misalignment of the leadscrew axis with the axis of the movable carriage. This greatly decreases the amount of manufacturing cost required to manufacture a precision machine. A leadscrew with these properties would be known as one that is self coupling, because it does not need a separate machine element or expensive hand finishing operation to couple it to the machine.

Previous attempts at eliminating friction in leadscrews through the use of hydrostatic leadscrews have all overlooked the need to also eliminate coupling errors (Inazaki, Japanese patent 58-166,162; Ernst et al, U.S. Pat. No. 2,320,352; Erickson et al, U.S. Pat. No. 3,171,295; and Inazaki, Japanese patent 58-166,161). These past hydrostatic leadscrew development attempts were guided by conventional leadscrew design methods. These methods are based on the historical need for elastic averaging between the screw and nut threads to reduce lead errors and backlash. Elastic averaging requires the nut to firmly grip the shaft so the threadform of the nut elastically deforms to match that of the leadscrew. This has the effect of averaging out lead errors, but then rigidly couples the nut to the leadscrew. In the days prior to precision electronic linear motion sensors, counting the turns of a precision screw was the only way to measure linear motion, and thus using an elastically averaged screw was the only way to attain accurate linear motion; however, this method also generated forces and moments along and about the non axial directions when the leadscrew was not exactly parallel to and aligned with the carriage to which the leadscrew nut was bolted. These forces and moments cause motion errors in the carriage and hasten wear of the leadscrew. With modern sensors (e.g. a laser interferometer), the leadscrew need only provide high resolution backlash free motion. It is as if designers have been holding on too strongly to their historical roots, and as a result they did not realize that if they integrate the design of a linear sensor with a leadscrew, the former would take care of the measuring and the latter would only have to be made self-coupling, backlash free, and frictionless. The hydrostatic leadscrew disclosed herein meets these criteria.

Accordingly it is an objective of the present invention to provide a mechanism to convert rotary power from a shaft to linear power in a linearly movable carriage without power losses due to friction in the mechanism.

Another objective is to accomplish rotary to linear power transmission with mechanical motion smoothness and accuracy on the order of microinches or less while using components which themselves have only been manufactured with a tolerance on the order of hundreds of microinches.

Another objective is to accomplish rotary to linear power transmission with the axial stiffness of the mechanism equal to or greater than the axial stiffness of any other component in the system, such as the leadscrew shaft.

A further objective is to provide a mechanism to accomplish the preceding objectives while acting as its own coupling between the nut and movable carriage such that only forces along an axis parallel to the axis of the leadscrew are transmitted from the nut to the carriage, while potential misalignment forces and moments along and about the other two axes that are orthogonal to the leadscrew axis are not generated or transmitted as a result of misalignment of the leadscrew axis with the axis of the movable carriage.

These and still further objectives are addressed hereinafter.

SUMMARY OF THE INVENTION

The foregoing objectives are attained, generally, in a mechanism to convert rotary power from a leadscrew to linear motion by way of a special threadform which utilizes high pressure air, oil, or some other fluid as an interface between a special threadform of a leadscrew and the special threadform of an associated nut. The special threadforms when supplied with high pressure fluid and incorporated into the design of a leadscrew and nut provide a way for the nut to convert the rotary power of the leadscrew to linear power, for powering a linear movable slide, without losing any power in the form of friction between the threadforms of the leadscrew and the nut. The mechanism furthermore uses the high pressure fluid interface between the threadforms to preload the nut thereby eliminating backlash between the leadscrew and nut. The mechanism also acts as its own coupling between the nut and a linearly movable carriage such that only forces along an axis parallel to the axis of the leadscrew are transmitted from the nut to the carriage, while potential misalignment forces and moments, along and about the other two axes that are orthogonal to the leadscrew axis are not generated or transmitted as a result of misalignment of the leadscrew axis with the axis of the movable carriage.

In this system the leadscrew rotates about its axis to effect parallel linear movement therealong of the nut, the cooperative threadforms of the leadscrew and nut being shaped to provide for a small degree of pitch and yaw and relative radial movement of the nut out of parallelity with the leadscrew; a means is provided for continuously supplying pressurized fluid between the cooperative threads of the leadscrew and nut, and a means is provided for controlling the fluid pressure continuously, for example with an orifice or other means such as a constant flow device, to provide high axial stiffness with substantially zero stiffness in yaw, pitch, rotation and radial motion while inhibiting mechanical contact and eliminating friction between the cooperative threads, thereby to maintain the linear movement of the nut parallel to the leadscrew axis. Frictionless motion between surfaces is required to prevent wear and allow for very precise positioning. Hence the mechanism is self coupling. As mentioned before, others have invented leadscrews and nuts that use high pressure fluid to minimize friction; however no attempt has been made to design the threadform to achieve true hydrostatic support, while at the same time providing a means to provide high axial stiffness with effectively zero stiffness in yaw, pitch, rotation and radial motion.

A pressurized fluid bearing is typically composed of two opposing bearings such that when a load is applied, the gap across one bearing decreases while the gap across the second bearing increases. The pressure in the bearing with the decreasing gap increases while the pressure in the bearing with the increasing gap decreases to create a pressure differential. The pressure differential acts to force the supported structure back in the direction of increasing gap. The orifices or other fluid flow control means prevent the pressurized fluid from escaping unrestricted through the side of the bearing with the increasing gap.

To date, no one has developed a self coupling frictionless leadscrew and nut combination. The principal problem has been in correctly identifying the problem of why certain error motions in machines exist, and then developing the correct threadform to provide high axial stiffness with substantially zero stiffness in yaw, pitch, rotation and radial motion, and a procedure to manufacture the threadform. This invention addresses each of these issues.

BRIEF CHARACTERIZATION OF THE DRAWING

The invention is described hereinafter with reference to the accompanying drawing in which:

FIG. 2 is a cross section schematic showing a portion of special threadforms of both the leadscrew and the nut in FIG. 1 which allows air or some other fluid to be used as a very stiff interface between the threadforms;

DETAILED DESCRIPTION OF THE PREFERRED EMBODIMENTS

Figure 1:
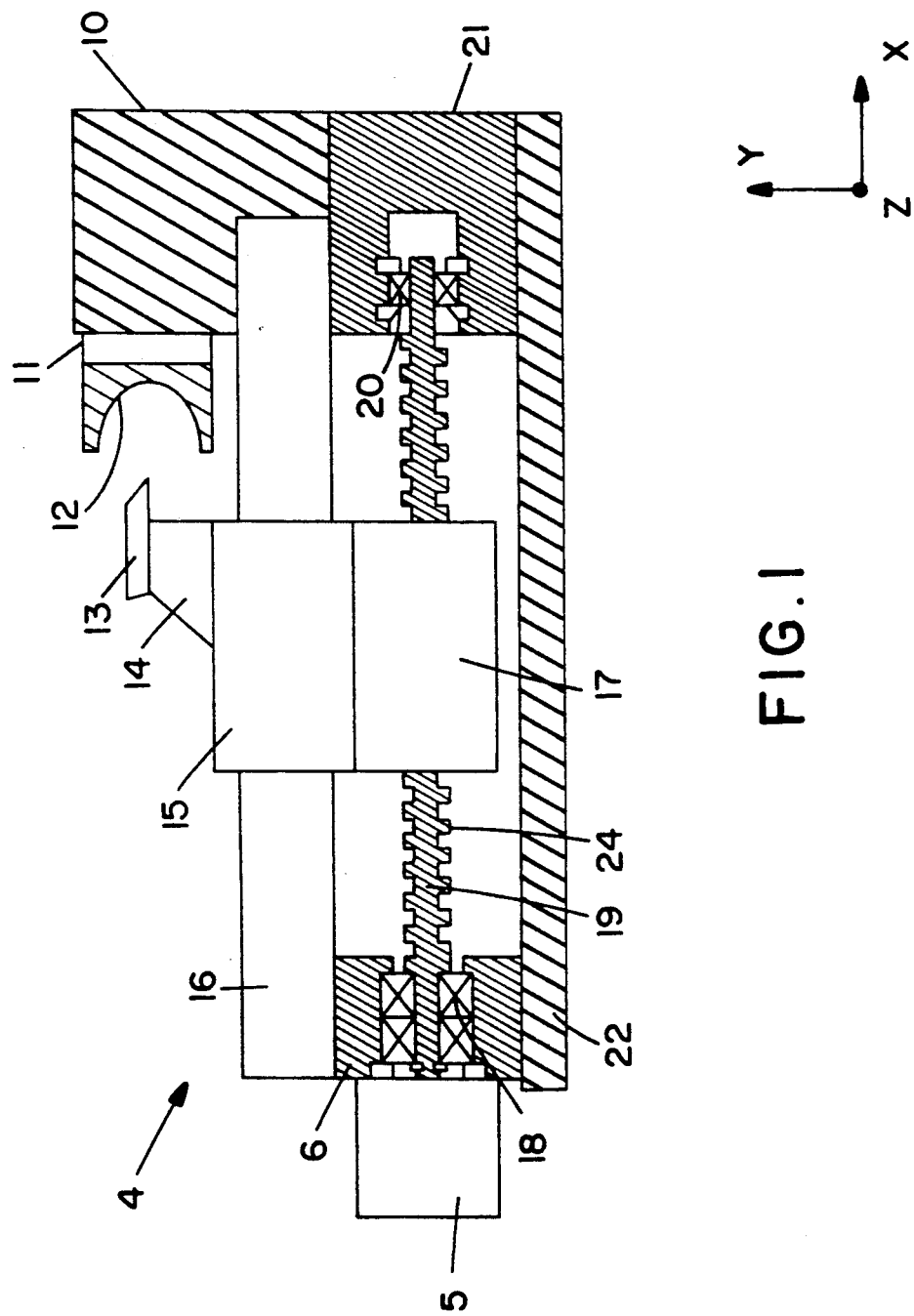
FIG. 1 is a schematic cutaway view of a machine that utilizes a leadscrew and nut to move a linear slide to which a tool is attached for machining a part.

The drawing shows a mechanism or system that is operative to convert rotary power from a leadscrew to linear motion of a nut by means of special threadforms which utilize high pressure air, oil, or some other fluid as an interface between the special threadforms of the leadscrew and the nut. As shown in FIG. 1, the mechanism would typically be used to operate a machine or system 4 which could be composed of a tail 6, a bed 22, a head 21, a headstock 10, a spindle 11 (that would have to be able to move along an axis orthogonal to that of a tool 13 in order to generate a curved surface as shown), a part 12 held to the spindle, a tool 13 held by a toolpost 14 that is anchored to a linearly movable carriage 15 that is supported by a linear bearing 16. A motor 5 turns a leadscrew 19 with the special threadform 24, as later discussed in detail. A nut 17 mates with the leadscrew 19 and converts rotary power to linear power to move the carriage 15 and the tool 13 for cutting a contour into the part 12, with very high efficiency and zero backlash or wear between the leadscrew 19 and the nut 17. The leadscrew 19 and mating aperture within the nut 17 are, of course, circular-cylindrical in shape and cross dimensions. In the leadscrew and nut system shown, rotation of the leadscrew about its axis effects parallel linear movement of the nut therealong with a very high effective axial stiffness, the cooperative threadforms of the leadscrew and nut being shaped to allow without resistance for small degrees of pitch, yaw, as well as small relative radial movement of the nut out of parallelity with the leadscrew. Hence the leadscrew and nut are self coupling.

To accomplish the conversion of power with high efficiency and zero backlash or wear between the nut 17 and the leadscrew 19, a special threadform is needed, as discussed herein. In the first case where many threads may be required, as shown in FIG. 2, an inner core 28A, containing the special threadform 28, is fastened to an outer core 30 by means of a bonding mechanism such as an adhesive 29 (or shrink fit techniques may be employed, or in some cases the geometry can be made from a solid piece). This threaded core can itself be made from a milling, turning, or grinding process used to make the leadscrew 19. The threadform of the nut 28 mates with the threadform 24 of the leadscrew 19 such that sufficient axial clearance 31 is provided between the nut and leadscrew threadforms to allow a cushion of high pressure air, oil, or some other fluid to act as an interface between them. The clearance 31 must also be sufficient to allow for rocking motion of the nut 17 about the Y and Z axes by an amount equal to the expected angular misalignment of the leadscrew 19 with the linearly movable carriage 15.

In addition, radial clearance 32 is provided between the threadform 28 of the nut 17 and the threadform 24 of the leadscrew 19 to allow for radial motion of the nut in the Y and Z directions by an amount equal to the expected lateral (radial) misalignment of the leadscrew 19 with the linearly movable carriage 15, and to allow high pressure fluid escaping from the clearances 31 between the nut and leadscrew threadforms to easily exhaust to the atmosphere.

The threadform 28 of the nut also contains shallow radially-elongate grooves 22A and 22B (shown greatly enlarged) to distribute and equalize the high pressure fluid along the length (i.e., radial dimension) of each respective side of the teeth of the nut threadform 28. These grooves are independent from each other and extend continuously in a helical fashion along the entire helix of each side of the nut's threadform 28, but are capped at the ends of the helix to prevent loss of the pressurized fluid. Orifices or other fluid flow control devices such as 23 (shown greatly enlarged) from fluid passages 26 are placed at intervals along the length of the grooves 22A and 22B to provide high pressure air along the entire helical length of the grooves and to the clearance 31 between the leadscrew and nut threadforms. The fluid supply holes, 26, extend radially inwardly from a larger reservoir 27 to intersect with the orifices and serve to supply high pressure fluid to them and hence to the grooves 22A and 22B. The radial holes 26 are drilled from outside the nut 17; press fit metal plugs 33 serve to plug the outside ends of the holes 26. High pressure fluid is supplied to the plenum 27 by a nozzle 20'. Radial exhaust holes such as 21 are drilled about the circumference of the nut 17 to help exhaust fluid in the radial clearance space 32 between the leadscrew and nut threadforms. For a single turn thread on the nut, typically as few as two fluid supply holes are needed, one for each side of the thread, and fluid exits out the ends of the nut so radial drain holes are not needed.

In order to successfully implement this design, it is necessary to provide a passage for the fluid to flow once it leaves the bearing, which is necessary to allow a pressure differential to form between the two sides of the nut threadform 28 in order to act as a restoring force. This is accomplished by making the root diameter 40 (minimum diameter) of the threadform 24 on the leadscrew less than the peak diameter 41 (minimum diameter) of the threadform 28 of the nut. Similarly, the maximum diameter 42 of the leadscrew thread 24 is less than the maximum diameter 43 of the nut. Typically, the difference in diameters should be on the order of 0.1-0.2 of the height of the thread. Freedom for the fluid to flow is also accomplished by drilling radial holes 21 in the nut to intersect the radial gap region 32. In the case of a single turn thread nut, radial holes are not required because the fluid that leaks into the radial clearance space then readily flows out the ends of the nut.

The second consideration is to allow the nut to function as its own coupling (i.e., self coupling) between itself and the leadscrew, and hence the movable carriage 15, such that only forces along the X axis are transmitted from the nut to the carriage, while forces and moments along and about the Y and Z axes (e.g., yaw and pitch) that could be generated or transmitted as a result of misalignment of the leadscrew axis with the axis of the movable carriage, are not generated or transmitted therebetween. If the teeth that form the threadforms of the leadscrew and nut have uniform cross sections, that is, the axial thickness at the root of each tooth substantially equals the thickness at the peak, then the nut will be able to move radially a small amount. Radial motion is accommodated by the aforementioned difference in diameters 40 and 41, and 42 and 43 of the leadscrew and nut respectively. The threadforms 24 and 28 have uniform cross sections. Thus the vertical threadform allows two of the required four degrees of freedom for coupling action. This means, however, that the leadscrew and the nut will not function unless the leadscrew 19 is anchored at both ends in bearings 18 and 20 and the nut 17 is rigidly attached to a linearly movable slide 15 that is supported by a linear bearing 16 that allows for primary motion only along the X axis. Error motions of the linear bearing will occur along and about axes orthogonal to the axis of linear motion, but these errors are allowed for by the self coupling nature of the leadscrew and nut. The self coupling nature of the leadscrew and nut allows error motions in the linear bearing to occur without resistance, thereby increasing their repeatability and the likelihood that they can be mapped and then compensated for digitally in the machine's controller.

Figure 3:
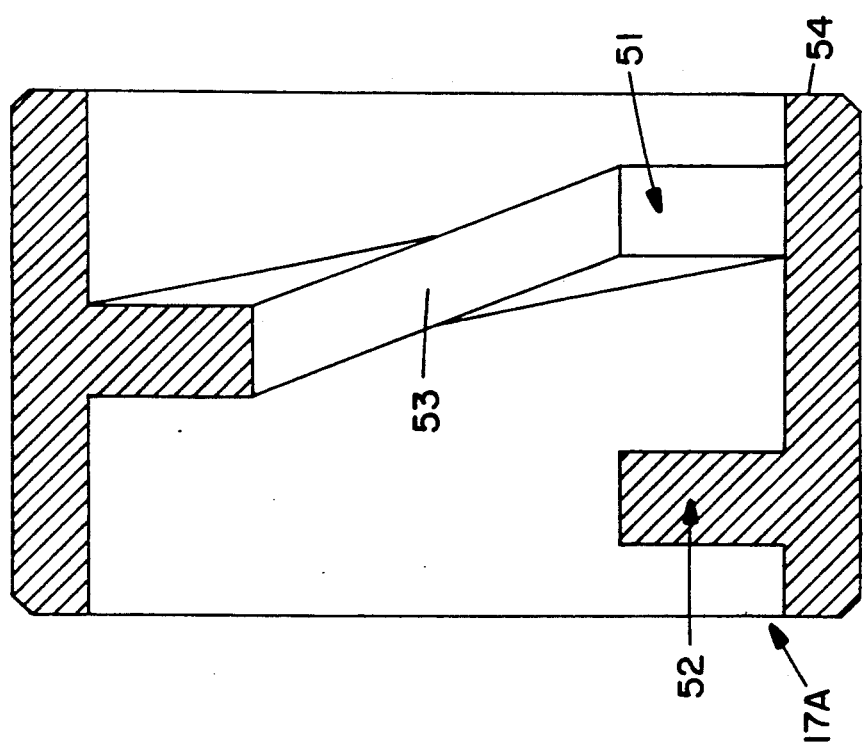
FIG. 3 is a cross section of a self coupling nut blank prior to it being threaded over the leadscrew and epoxy poured into the space between the threads of the nut and leadscrew, and through the use of putty and mold release wax, obtaining proper radial and axial clearances and the helical grooves in the epoxy cast threads.
Figure 5:
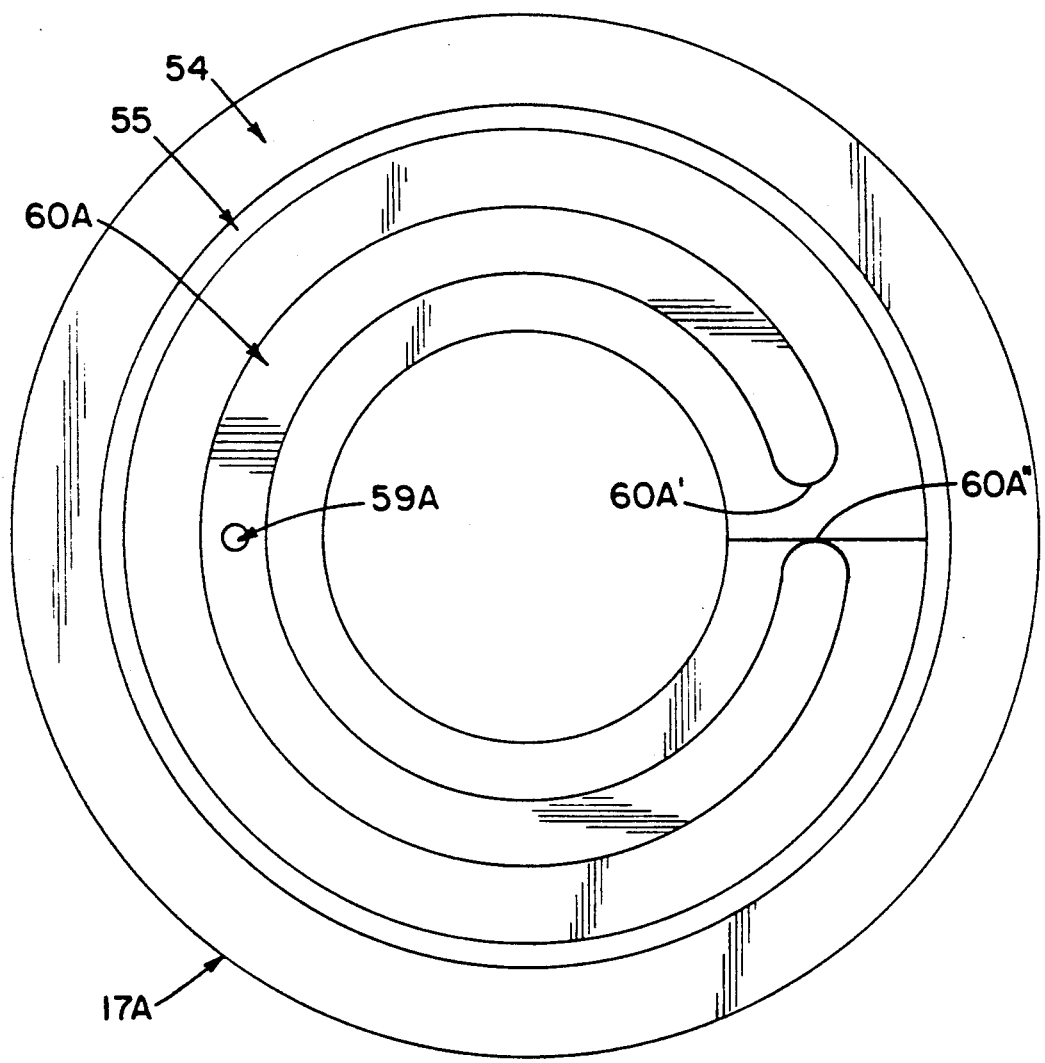

The remaining two degrees of freedom required are those that prevent moments from being transmitted about axes that are orthogonal to the axis of the leadscrew (i.e., the Y and Z axes). If the fluid bearing interface between the threadforms were constructed only with orifices or other fluid flow control devices and independent recesses along the length of the thread helix, then the nut would transmit the undesirable moments. If, however, the recesses on each side of the threadform are connected together (but not to the recesses on opposite sides of the thread) to form a long helical groove that runs the length of the thread helix on the nut (but just shy of the ends of the helix), then the pressure along one side of the thread will be constant throughout. As the nut is rotated about the Y or Z axis through a small error motion of the linear bearing carriage that supports the nut, the gap, for example, between the left side of the thread on the upper side of the leadscrew opens while the gap on the left side of the thread on the lower side of the leadscrew closes. Usually, this would result in a correcting force couple (moment) being generated by a pressure differential resulting from one gap opening and one gap closing; however, if a pressure equalizing groove such as 22A which connects the recesses is cut or formed into the threadform to connect all the recesses fed by the orifices, then the pressure will equalize along one side of the thread and no force couple (moment) will be generated. An analogous situation exists for the right side of the thread. Thus the pressure equalizing grooves 22A and 22B act to prevent generation of moments about the Y and Z axes between the leadscrew and linear bearing carriage that supports the nut. The grooves 22A and 22B, as above noted, are radially-elongate depressions at each side of each tooth forming the nut threadform 28 and each groove is disposed along a helical path that extends axially along the nut threadform 28. These pressure equalizing grooves also act to allow the use of non rectangular threadforms such as Acme or triangular, while still allowing the nut to move radially. Use of a non rectangular threadform may be desirable in some special cases as they may be easier to grind or machine. The shape of the threadform will determine how much radial error motion can be tolerated before mechanical contact is made between threads. Although other different types of threadforms can be made to work, it has been found that the rectangular threadform, as shown in FIG. 2, maximizes ability of the design to provide the desired self-coupling action. Furthermore, it has been found that to maximize the coupling action (amount of error motion that can be accommodated) while matching stiffness of the nut to that of the leadscrew, the depth of the leadscrew thread should be on the order of one-quarter of the outside diameter of the leadscrew. In most instances, this allows a single turn of the nut thread to provide the required load carrying capability and stiffness. The nut shown in cross-section in FIG. 3 is a single-thread nut 17A which herein greatly diminishes problems associated with the manufacture of the two piece nut labeled 17 in FIG. 2 but, as previously noted, enhances self coupling between the nut 17A and the leadscrew. Use of a nut with a single turn thread nut allows the threadforms to be easily machined integral with the structural housing 54 (equivalent to part 30 in FIG. 2) despite the large depth of the thread. The single thread 53 with starting point labeled 52 and projecting out of the page of the drawing and ending at 51 in the plane of the drawing, is made 25% thinner, but with the same lead, as the threadform of the leadscrew. The nut can then be threaded over the leadscrew and epoxy poured or injected into the space between the threads of the nut and leadscrew. Through the use of putty and mold release wax, one can obtain proper radial and axial clearances and the helical grooves in the epoxy cast threads. This leaves great flexibility in manufacture of the rough nut threadform. For example, it could be turned on a lathe, investment cast, or machined from each side using a three axis milling machine.

Figure 4:
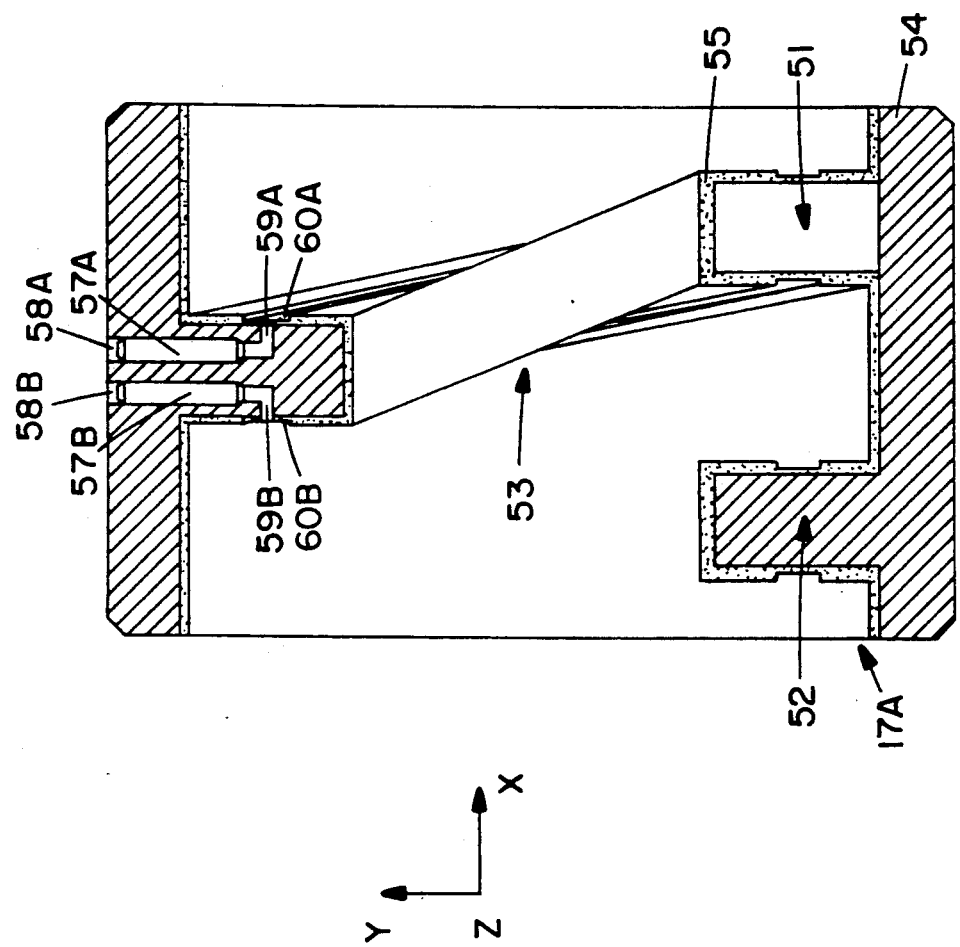
FIG. 4 is a cross section of the self coupling nut after the epoxy has been cast about its threads.

FIG. 4 shows the self coupling nut after the epoxy has been cast and fluid supply holes drilled. The epoxy layer 55 adheres to the thread 53, and through the use of mold release wax and putty on the leadscrew threadform, allows the fluid distribution grooves 60A and 60B to be formed on each side of the thread 53. As noted earlier, the grooves run the length of the helix on each side of the thread, but the grooves are not connected and their ends are capped to prevent high pressure fluid from freely exiting the ends. In FIG. 4, the cross section cuts the thread at a point where the epoxy has not covered the ends of the threadform, and hence the grooves 60A and 60B still appear to be open at the ends. FIG. 4 also shows the nut with fluid flow control devices 57A and 57B in fluid supply holes 58A and 58B respectively. High pressure fluid would be supplied to the holes 58A and 58B, and the devices 57A and 57B would provide constant flow regardless of pressure to their respective grooves 60A and 60B through axial holes 59A and 59B. Constant flow devices make for a much higher stiffness bearing than do orifices which merely act as resistances which regulate flow as a function of pressure and orifice resistance (i.e. analagous to Ohms law, P=QR). Constant flow devices are commercially available, for example, from the Lee Company, Westbrook. Conn. USA.

For purposes of analyzing the achievable stiffness of the leadscrew and nut, it can be assumed that a fluidstatic bearing with properly sized orifices or other flow control devices and bearing area can conservatively achieve a load rating equal to the product of one half the projected area of the bearing with the maximum fluid pressure provided. If incorporated into a nut 17 with N turns of thread 28 and overlapping region between the thread of the leadscrew and nut of radii $R_o$ and $R_i$, respectively, the maximum axial force, $F_{axial\ max}$, the fluidstatic bearing nut can support when supplied with fluid at pressure P without making mechanical contact with the leadscrew is on the order of:

$$F_{axial\ max} \approx \frac{PN\pi(R_o^2 - R_i^2)}{2} \quad (1)$$

A conservative estimate for the apparent stiffness of the fluidstatic bearing is one half of the load divided by the equilibrium gap $\delta_A$ between the threads:

$$K_{fluid} \approx \frac{PN\pi(R_o^2 - R_i^2)}{4\delta_A} \quad (2)$$

The stiffness of the threadform itself also has to be considered. Since the depth of the thread may be on the order of its width t, shear as well as bending deformations must be considered. A conservative assumption is to assume that the width of an equivalent "beam" is equal to the length of the helix made by the thread, but that the helix form itself does not contribute to the stiffness of the "beam". The combined bending and shear stiffness $K_{thread}$ of the threads is:

$$K_{thread} = \frac{15EIAG}{5AGL^3 + 18LEI} \quad (3)$$

where A is the area of the thread along its length, I is the second moment of the area, G and E are the shear and Young's modulus respectively, and L is the depth of the thread. Furthermore, let it be assumed that the equivalent of the distributed load applied by the pressurized air is a line force applied along the length of the helix at the midpoint of the threads height. The area, second moment of the beam cross section, and length of the beam are thus given by:

$$A = N\pi(R_i + R_o)t \quad (4)$$

$$I = \frac{N\pi(R_i + R_o)t^3}{12} \quad (5)$$

$$L = \frac{R_o - R_i}{2} \quad (6)$$

where t is the width of the thread, often equal to the pitch. Substituting these values into expression (3) gives the stiffness of the nut threads as a function of their physical dimensions and material properties (E and G are the Young's and shear modulii of the material the nut is made of, respectively). The leadscrew threads also deform by an equal amount, thus the combined thread stiffness is:

$$K_{thread} = \frac{5EN\pi(R_o + R_i)t^3G}{(R_o - R_i)[5G(R_o - R_i)^2 + 6Et^2]} \quad (7)$$

The stiffness of the leadscrew shaft is most often the "soft" link in a leadscrew/nut system. Assuming that the helix form of the thread does not contribute to the stiffness of the shaft, and the length of the shaft is l, the stiffness of the shaft is given by:

$$K_{shaft} = \frac{\pi R_i^2 E}{l} \quad (8)$$

The total stiffness $K_{total}$ of the assembly is a function of all the component stiffnesses laid end to end which is given by the inverse sum of the inverses of the component stiffnesses:

$$K_{total} = \frac{1}{\frac{1}{K_{shaft}} + \frac{1}{K_{thread}} + \frac{1}{K_{fluid}}} \quad (9)$$

As a first example, consider the case where pressurized air is used the following dimensions and values are assumed:

t = 0.188 inches
$R_o$ = 1.0 inches
P = 100 psi
$R_i$ = 0.5 inches
l = 20 inches
E = 29 × 10$^6$ psi
G = 11 × 10$^6$ psi
$\delta_A$ = 0.0002 inch Then:

$K_{shaft}$ = 1,138,826 lb/inch
$K_{thread}$ = 5,019,438*N lb/inch
$K_{fluid}$ = 294,524*N lb/inch If N is only four threads, then the nut will be as stiff as the leadscrew with one million pounds per inch. The length of the nut required to accommodate the desired number of threads will be equal to twice the product of the lead and the number of threads. Thus for the above example, if the lead is one-half inch, the nut will be about four inches long.

As a second example, consider the case where pressurized oil is used the following dimensions and values are assumed:

t = 0.188 inches
$R_o$ = 1.0 inches
P = 2000 psi
$R_i$ = 0.5 inches
l = 20 inches
E = 29 × 10$^6$ psi
G = 11 × 10$^6$ psi
$\delta_A$ = 0.001 inch Then:

$K_{shaft}$ = 1,138,826 lb/inch
$K_{thread}$ = 5,019438*N lb/inch
$K_{fluid}$ = 1,178,096*N lb/inch Note that only one turn of the thread is required to achieve over one million pounds per inch stiffness and that since the gap is five times that of the gap for an air bearing, the angular self coupling abilities will be an order of magnitude greater than for the system that used pressurized air; however, one must remember that oil is a messy fluid to work with so in some cases air will still be the preferred fluid in some cases.

As shown by both of these examples, the nut can easily be twice as stiff as the leadscrew while having a reasonable size thread and lead. This also gives a stiffness almost twenty times that of a comparable rollerscrew or ballscrew equipped with a flexible coupling system that attempts to allow for potential misalignment forces and moments, along and about the other two axes that are orthogonal to the leadscrew axis. Also typically the depth of the thread of the invention will be on the order of the radius of the minor diameter leadscrew.

The leadscrew-nut system shown herein, with high, controlled fluid pressure between the threads of the leadscrew and the nut, results in high axial stiffness of the system with effectively zero stiffness in yaw, pitch, rotation and radial motion while inhibiting mechanical contact between the cooperative threads, thereby, in an operative system, to maintain the linear movement of the nut parallel to the leadscrew axis and thus providing means for self coupling action between the nut and the leadscrew.

Further modifications of the invention will occur to persons skilled in the art and all such modifications are deemed to be within the scope of the invention as defined by the appended claims.

What is claimed is:

1. A leadscrew and nut system wherein rotation of the leadscrew about its axis effects parallel linear movement therealong of the nut, the cooperative threadforms of the leadscrew and nut being shaped to provide for a small degree of pitch and yaw and relative radial movement of the nut with respect to the leadscrew, means for continuously supplying pressurized fluid between the cooperative threads of the leadscrew and the nut, and means for controlling the fluid flow and hence pressure continuously to provide high axial stiffness with effectively zero stiffness in yaw, pitch, rotation and radial motion while inhibiting mechanical contact between the cooperative threads, the nut being supported by a linearly movable linear bearing supported carriage to allow for the linear movement of the nut essentially parallel to the leadscrew axis, each said cooperative threadform of the leadscrew and the nut having a depth that is equal to greater than the width of the threadform, and the depth of the thread being on the order of one-quarter the major diameter of the leadscrew, and the number of thread turns on the nut being optimally on the order of one to three.

2. A leadscrew and nut system according to claim 1 wherein the means for controlling fluid pressure comprises means for presenting differential fluid pressure on each side of the nut threads to provide high axial stiffness while providing said substantially zero stiffness to yaw, pitch, and effect relative radial motion.

3. A leadscrew and nut system according to claim 2 wherein the differential fluid pressure presenting means comprises means for separately introducing fluid on each side of the nut thread and venting the fluid from the root of such thread.

4. A leadscrew and nut system according to claim 3 in which venting is achieved by having the radial gap between the leadscrew outside diameter and the root of the nut thread and the gap between the inside diameter of the nut and the root of the leadscrew, on the order of ten percent of the thread depth.

5. A leadscrew and nut system according to claim 4 in which shallow groove means in the sides of the nut thread provide pressure equalizing action around the inner circumference of the nut that prevents the development of differential fluid pressure between regions of the same side of a thread in response to yaw, pitch, and radial motion, thereby allowing said nut to undergo small error motions along and about all axes which in combination with said deep threadform and optimally one to three nut thread turns, thereby providing high axial stiffness and force transmission without transmitting forces and moments caused by misalignment errors between said leadscrew and said carriage which supports said nut.

6. A leadscrew and nut system according to claim 1 in which the nut threads are made 25% thinner, but with the same lead, as those of the leadscrew so the nut can then be threaded over the leadscrew.

7. A leadscrew and nut system according to claim 6 in which the nut has a single threadform.

8. In a system that includes a linearly movable carriage, a mechanism to convert rotary motion from a leadscrew to linear motion of a nut by way of special threadforms which utilize a fluid as an interface between the special threadform of the leadscrew and the special threadform of the nut, said mechanism comprising:

a leadscrew with a threadform formed into its length;

a nut mechanically secured to the carriage, said nut being configured to mate with said leadscrew and being operable to convert rotary power provided by said leadscrew to linear power for moving said carriage with a very high efficiency and zero backlash or wear between said leadscrew and said nut, the nut having a single-turn threadform;

the single-turn threadform formed into said nut being adapted to mate with the threadform of said leadscrew, axial clearance being provided between the nut threadform and the leadscrew threadform to allow a cushion of a high pressure fluid to act as an interface between the threadforms, said clearance also allowing for limited yaw and pitch motion of said nut about said leadscrew by an amount equal to the expected angular misalignment of said leadscrew and said linearly movable carriage.

9. In a system that includes a linearly movable carriage, a mechanism to convert rotary motion from a leadscrew to linear motion of a nut by way of special threadforms which utilize a fluid as an interface between the special threadform of the leadscrew and the special threadform of the nut, said mechanism comprising:

a leadscrew with a threadform formed into its length;

a nut mechanically adapted to be secured to the carriage, said nut being configured to mate with said leadscrew and being operable to convert rotary power provided by said leadscrew to linear power for moving said carriage with a very high efficiency and zero backlash or wear between said leadscrew and said nut, said nut having a threadform formed into said nut that is adapted to mate with the threadform of said leadscrew, axial clearance being provided between the nut threadform and the leadscrew threadform to allow a cushion of a high pressure fluid to act as an interface between the threadforms, said clearance also allowing for rocking motion of said nut about said leadscrew by an amount equal to the expected angular misalignment of said leadscrew and said linearly movable carriage, the threadform being formed into said nut and being adapted to mate with the threadform of said leadscrew and to provide radial clearance between the nut threadform and the leadscrew threadform to allow for radial motion of said nut about said leadscrew by an amount equal to the expected linear misalignment of said leadscrew with said linearly movable carriage without providing a resistive force or allowing mechanical contact to occur between the threadforms of said nut and leadscrew, and to allow high pressure fluid to escape from said clearance between the juxtaposed threadforms and to exit easily from the region between said nut and said leadscrew.

10. A system according to claim 9 in which the leadscrew and the nut are self coupling, that is, the cooperative threadform of the leadscrew and nut are shaped to allow without resistance for small degrees of pitch, yaw, as well as small radial movement of the nut with respect to the leadscrew.

11. A system according to claim 10 in which the nut threadform contains shallow grooves, that are operable to distribute and equalize the high pressure fluid at each respective side of the teeth of the nut threadform, which grooves at each respective side are independent of one another and extend continuously in a helical fashion along the entire helix length of each side of the nut's threadform, but are capped at the ends of the helix to prevent the unregulated loss of the pressurized fluid.

12. A system according to claim 11 having fluid flow control devices along the lengths of the grooves to provide a regulated flow of high pressure fluid along the entire length of the grooves.

13. A system according to claim 10 in which the nut threadform consists of no more than about three thread turns.

14. A system according to claim 10 in which the nut threadform is a single thread turns.

15. For use in a system that includes a linearly movable carriage or the like, a mechanism to convert rotary motion of a leadscrew to linear motion of a nut, said mechanism comprising:

a leadscrew having a special threadform or leadscrew threadform; and a nut to receive the leadscrew, having a special threadform or nut threadform that matches the leadscrew threadform with a pressurized fluid interface therebetween, there being both axial clearance and radial clearance sufficient to accommodate angular and lateral misalignment between the leadscrew and the movable carriage, said nut being adapted to be rigidly secured to the carriage, the leadscrew threadform and the nut threadform serving to enable the nut to act as a coupling between itself and the leadscrew (or self-coupling) and hence the carriage or the like and the leadscrew such that only forces along an axis parallel to the axis of the leadscrew are transmitted from the nut to the carriage or the like and potential misalignment forces and moments orthogonal to the leadscrew axis are not generated or transmitted, at least one of the leadscrew threadform and the nut threadform having means to equalize fluid pressure therealong.

16. Apparatus according to claim 15 that includes a source of high pressure fluid connected to introduce the high pressure fluid to said pressurized fluid interface to achieve the self coupling, the only forces between the nut threads and the leadscrew threads being along an axis parallel to the leadscrew axis, while potential misalignment forces and moments therebetween, about the other two axes that are orthogonal to the leadscrew axis, are eliminated and thus misalignment movements are allowed.

17. For use in a system that includes a linearly movable carriage or the like, a mechanism to convert rotary motion of a leadscrew to linear motion of a nut, said mechanism comprising;

a leadscrew having a special threadform or leadscrew threadform; and a nut to receive the leadscrew, having a special threadform or nut threadform that matches the leadscrew threadform with a pressurized fluid interface therebetween, there being both axial clearance and radial clearance sufficient to accommodate angular and lateral misalignment between the leadscrew and the movable carriage, said nut being adapted to be secured to the carriage, said nut threadform containing shallow independent grooves along both sides of the nut threadform to distribute and equalize fluid axially along the nut, while allowing the nut to undergo limited pitch or yaw motion without restraint, the teeth forming both the leadscrew threadform and the matching nut threadform having rectangular cross sections, that is, the axial thickness at the root of each tooth substantially equaling the axial thickness at the peak thereof, and in which the root diameter of the leadscrew threadform is less than the peak diameter of the nut threadform, in which the maximum outside diameter of the leadscrew threadform is less than the maximum inside diameter of the nut threadform, the differences in diameters being on the order of 0.1-0.2 of the height of the thread, said nut threadform including a maximum of about three thread turns.

18. A mechanism according to claim 17 in which the nut threadform is one thread.

19. A mechanism according to claim 17 that includes a passage for fluid to flow from between the leadscrew threadform and the nut threadform to allow a pressure differential to form between the two sides of the nut threadform in order to act as a restoring force, the root diameter (minimum diameter) 8 the leadscrew threadform being less than the peak diameter (minimum diameter) of the nut threadform.

20. A mechanism according to claim 19 that further includes means to leak or convey or pass said fluid from the ends of the nut and hence from between the leadscrew threadform and the nut threadform.

21. A mechanism to convert rotary motion to linear motion, that comprises:
    a leadscrew having a leadscrew threadform;
    a nut having a nut threadform that matches the leadscrew threadform, said nut threadform consisting of no more than about three threads;
    both the leadscrew threadform and the nut threadform comprising threads whose axial thickness of the root of each tooth substantially equals the thickness of the peak thereof, i.e., rectangular threads; and
    means to introduce fluid under pressure into the interface between the leadscrew threadform and the nut threadform to provide self coupling therebetween.

22. A mechanism according to claim 21 in which the nut threadform is about one thread turns the leadscrew threadform and the nut threadform being conformed to provide high axial stiffness with substantially zero stiffness in yaw, pitch, rotation and radial motion while inhibiting mechanical contact and eliminating mechanical contact and friction between the cooperative threads, that is, self coupling between the leadscrew and the nut, thereby to maintain linear movement of the nut parallel to the leadscrew axis, despite small mechanical irregularities between the leadscrew threads and the nut threads to provide frictionless movement to prevent wear and allow for very precise positioning.

23. A mechanism as in claim 21 in which the fluid at said interface serves to damp out mechanical noise and eliminate backlash between the leadscrew and the nut.

24. A mechanism according to claim 21 wherein said means to introduce fluid under pressure is operable to deliver high, controlled fluid pressure between the threads of the leadscrew and the nut, and in which the leadscrew and nut form a leadscrew-nut system which, in combination with the fluid under pressure at said interface, serves to provide high axial stiffness in the system with effectively zero stiffness in yaw, pitch, rotation and radial motion while inhibiting mechanical contact between the threads, thereby, in an operative system, to maintain linear movement of the nut parallel to the leadscrew axis and thus provide means for self coupling action between the nut and the leadscrew.

25. A method of converting rotary motion to linear motion in a system, which method comprises:
    providing a leadscrew with a threadform formed into its outer surface along its length dimension;
    providing a nut to receive the leadscrew, which nut has a threadform formed into its inner surface along its axial length direction (or dimension), the number of thread turns on the nut being no greater than three thread turns, the threadform of the nut mating with the threadform of the leadscrew, axial clearance being provided between the threadform of the nut, or nut threadform, and the threadform of the leadscrew, or leadscrew threadform, to permit a high pressure fluid to act as an interface between the two threadforms, which clearance also allows for rocking motion of the nut about the leadscrew by an amount sufficient to accommodate angular misalignment of the leadscrew within the system, the threadform of the leadscrew and the threadform of the nut serving to enable the nut to act as a coupling between itself and the leadscrew (i.e., self-coupling) and a system part to which said linear motion is imparted such that only axial forces along an axis parallel to the leadscrew axis are transmitted between the leadscrew and the nut and hence the leadscrew and the system part.

26. A method according to claim 25 in which the nut is provided with a threadform with no more than about one thread with equalizing side grooves.

27. A method according to claim 25 that includes introducing said high pressure fluid between said two threadforms to provide said interface, whereby the self coupling is achieved, that is, mechanical contact between the threads of the nut and the threads of the screw is eliminated and only axial loads are supported, all other loads and moments being resisted.

* * * * *